June 30, 1931.    M. M. TITTERINGTON    1,812,503
INCLINOMETER
Filed Dec. 10, 1923    2 Sheets-Sheet 1

INVENTOR
Morris M. Titterington

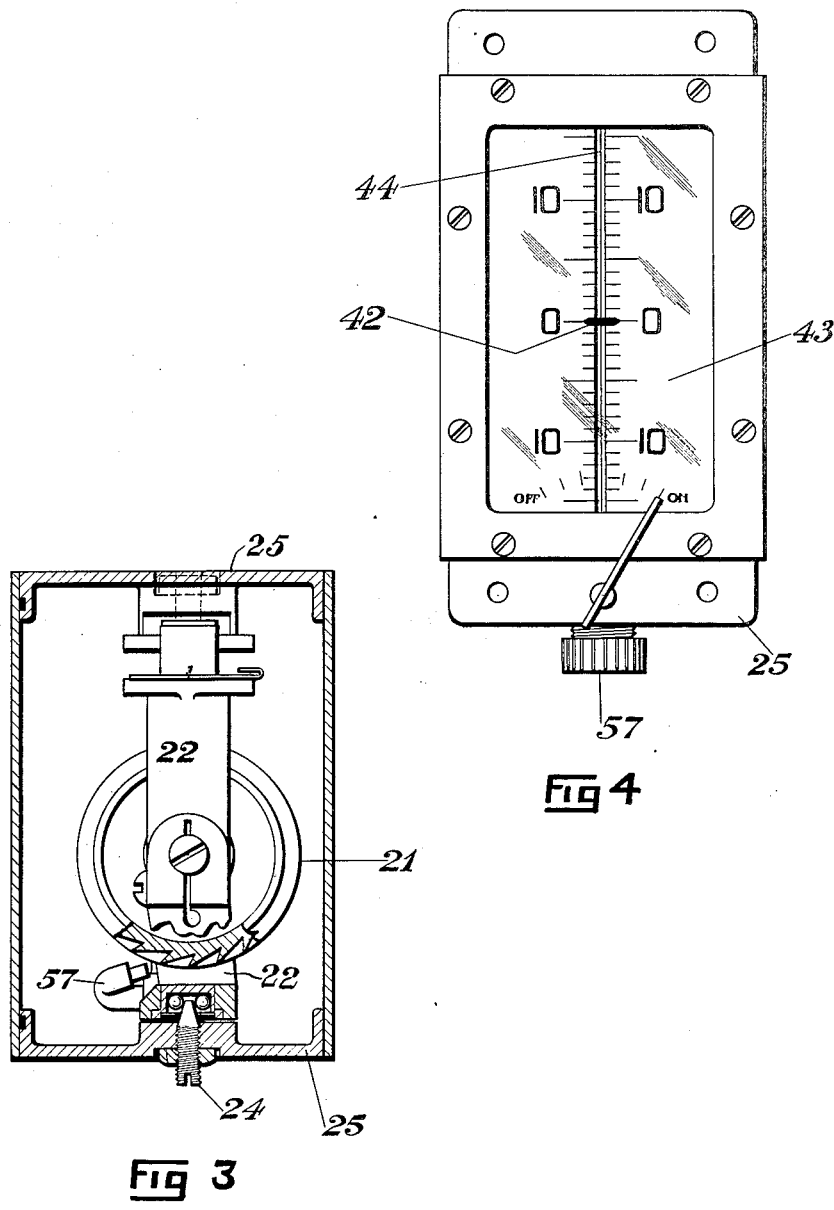

Patented June 30, 1931

1,812,503

UNITED STATES PATENT OFFICE

MORRIS M. TITTERINGTON, OF BROOKLYN, NEW YORK, ASSIGNOR, BY MESNE ASSIGNMENTS, TO PIONEER INSTRUMENT COMPANY, INCORPORATED, OF BROOKLYN, NEW YORK, A CORPORATION OF NEW YORK

INCLINOMETER

Application filed December 10, 1923. Serial No. 679,571.

This invention relates to instruments for indicating movement about an axis. More particularly it relates to inclinometers suitable for use on aircraft.

Among other objects, it is an object of this invention to provide an indicator of the fore-and-aft, or longitudinal, attitude of a navigable craft, such as an airplane, balloon or submarine vehicle. It is a further object of my invention to provide in such an indicator means for compensating for acceleration of the vehicle. It is a still further object of this invention to provide instruments embodying the advantages of a simple pendulum and a gyroscopic element, without the disadvantages of either when used alone. Other objects and advantages will appear as the invention is hereinafter disclosed.

While a practical embodiment of this invention is shown in the drawings and disclosed in these specifications, it will be understood that various modifications may be resorted to within the scope of the appended claims.

Referring to the drawings which illustrate what I now consider a preferred form of the invention:

Figure 3 represents a partial front view, section being taken at 3—3 of Figure 1

Figure 4 represents a front view showing the scale and indicator.

Figures 1, 2:
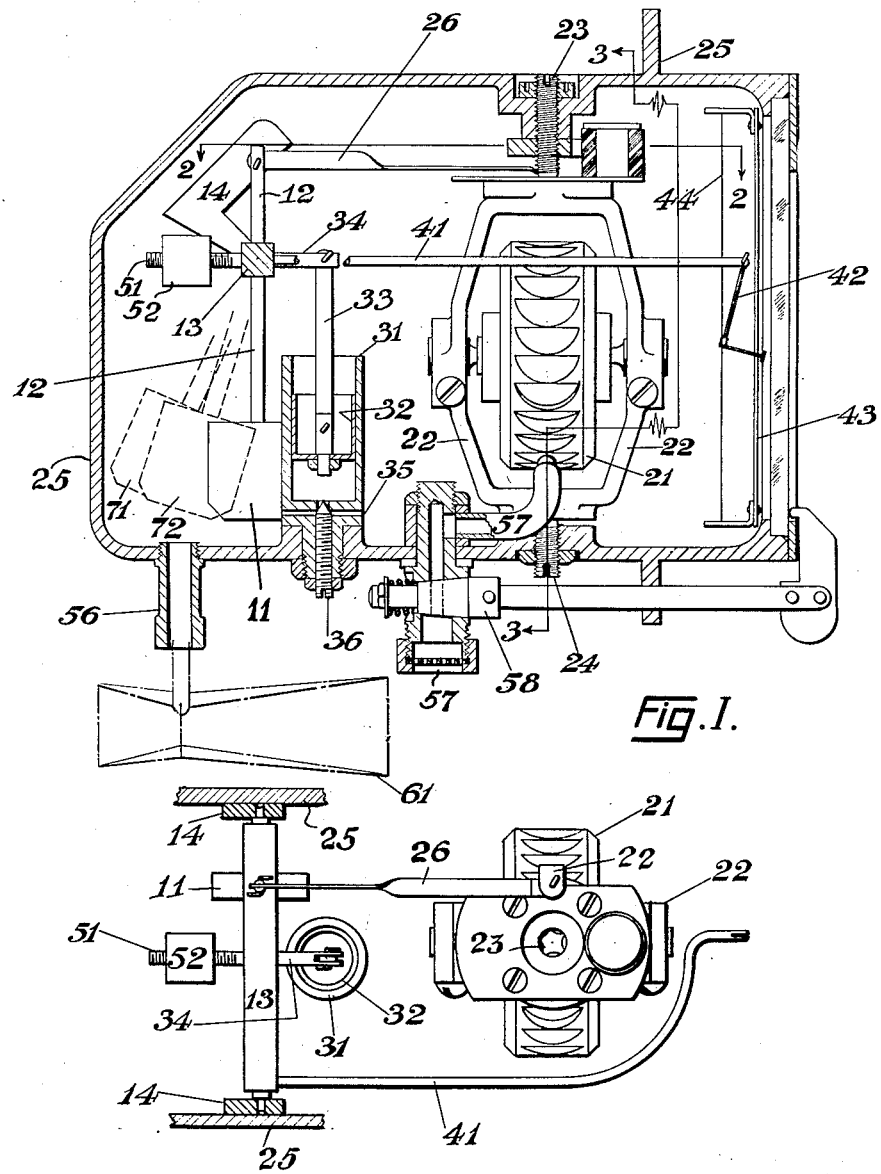
Figure 1 represents a side elevation partially in section
Figure 2 represents a partial top view, with the casing largely removed, section being taken at 2—2 of Figure 1

Referring to the drawings, a pendulum bob 11 is attached to rod 12 which extends through and is secured to the axle 13, the latter being pivoted in bearings 14 carried by the housing or case 20 of the inclinometer.

A gyroscope 21 is rotatably supported in frame 22, which is carried upon pivots 23 and 24 attached to the casing 25.

A link 26 connects the frame 22 with the pendulum rod 12. The gyroscope employed is essentially of the two-degree-of-freedom type. A dash-pot 31 is attached to the casing 25, and its piston 32 is connected through link 33 to lever 34, which is secured in axle 13. A hole 35 connects the inside of the dash-pot cylinder 31 to the inside of the casing 25, and a valve 36 regulates the size of this passage. The dash-pot shown uses air as a fluid although oil or any other liquid might be employed.

An arm 41 is secured to the axle 13, and carries at its forward end a hand 42, adapted to move over a scale 43. The hand 42 is guided by a slide-wire 44 so that it moves in a substantially vertical line.

Rod 51 extends from axle 13 and carries a counterweight 52 adjustable thereon to balance the moving parts such as the dashpot parts 32 and indicating elements 41 and 42.

The case 25 is substantially air-tight, except for the exhausting tube 56 and the impelling jet tube 57. A valve 58 is interposed between the jet 57 and the outside of the case. Power for driving the gyroscope is obtained by withdrawing air from the case through the tube 56, the outside air rushing in through jet 57 and impinging upon the periphery of the gyroscope. A Venturi tube 61 as shown, may be used on an aircraft for supplying suction to evacuate the housing 25 and thus run the gyroscopic rotor 21 by an air stream issuing from the jet or nozzle 57.

The functional relation between the various parts will now be described. It will be noted that there are disclosed a pendulum, a gyroscopic element, a damping element, a balancing element, and an indicator.

First assume the gyroscopic element to be disconnected from the pendulum and other elements and then consider the relation of the other parts. Without the gyroscope the mechanism comprises a simple pendulum inclinometer with a damper. If this structure, without the gyroscope, is carried on an airplane, for example, and the airplane tips forward, the pendulum 11 will assume the relative position, say, shown dotted at 71. As the airplane tips forward, however, it increases its forward speed. This acceleration affects the pendulum 11 as a centralizing force, and drives it back to the relative position shown at 72. The deflection and indication of the hand 42, therefore, are less than the angle through which the airplane has actually tipped and produces an erroneous indication. This is the fault of pendulus indicators: being affected by longitudinal acceleration as well as by gravity, they indicate an angle other than the actual change in position of the vehicle on which they are mounted.

Now assume the pendulum 11 to be removed and the gyroscopic element alone connected to the hand 42. If, with the gyroscope running, the airplane tips forward, the gyroscope and frame will precess, moving the link 26, and causing an indication of descent on the dial 43. This action of the gyroscope, the precession thereof, is caused by the tipping of the airplane about a lateral axis and the precession of course stops when the tipping ends. The fault of a purely gyroscopic indicator is this: It responds to angular motion but when the airplane is not in the act of tipping its position is unrelated to the vertical. If the airplane holds any attitude, level or otherwise, and does not tip or change therefrom, the gyroscope does not assume any definite position but holds or remains in any position in which it may happen to have been at the time the tipping of the airplane ceased.

Now assume both the gyroscope and the pendulum as in this invention to be connected, as illustrated. The tipping of the airplane involves three actions affecting the instrument; first, the change in longitudinal attitude involving angular movement and causing the precession of the gyroscope; second, the new position assumed in respect to gravity, causing the pendulum to assume a new position in relation to the case; and third, the forward acceleration accompanying the tipping, thereby forcing the pendulum back toward its central position. I have therefore devised a means of compensating for the effect of acceleration on the pendulum, by providing a gyroscope which exerts a force on the pendulum in opposition to the force of acceleration. In other words, the gyroscope may be said to impart reliability to the pendulum.

By properly designing the linkage connection between the pendulum and the gyroscopic element in a specific instrument under construction, or by varying the strength of the gyroscopic effect, (as by means of adjusting the valve 58 or otherwise) it is obvious that any degree of compensating, or over-compensation, of the acceleration force may be obtained. For ordinary use on an aircraft it is not necessary to so relate the gyroscope and pendulum as to exactly correct the acceleration effect under all conditions. The gyroscope may be so related to the pendulum that it only partially compensates for the acceleration effect. It may be made to just balance the acceleration effect. Or it may be made strong enough, as compared to the pendulum, so that the gyroscopic effect predominates.

One of the important uses of a fore-and-aft inclinometer on an airplane is to enable the pilot to maintain the airplane level longitudinally, and aid in avoiding tipping. Due to the acceleration forces present in a flying aircraft, a simple pendulous type of indicator, without a gyroscope cooperating therewith, is not suitable for this purpose, and likewise a gyroscopic element is not of itself sufficient. With my device however, the sensitiveness of the indicator at or near the zero position can be made any value desired by properly relating the strengths of the gyroscope and pendulum.

Thus by properly coordinating a simple pendulum and a two-degree-of-freedom gyroscope as in my invention I cause each element to exercise a control one over the other. When acceleration forces are acting, thereby rendering a simple pendulum unreliable, the airplane is usually pitching (tipping about its lateral axis). This angular motion of the airplane and the accompanying change in angular displacement (tipping) of the airplane brings into play the precessional force of the gyroscope to compensate the pendulum. Conversely, when angular motion and acceleration forces cease, the precessional force simultaneously ceases and the gyroscope offers no interference to the normal functioning of the pendulum in respect to gravity. Accurate indications of the flight attitude of the airplane are therefore produced so long as such attitude remains unchanged, but change of attitude instantly brings into action the gyroscopic compensating control. This instrument is therefore rendered a very useful and practical accessory to aerial navigation.

I claim:

1. In combination, a pendulum and means mounting it to swing about an axis, a gyroscope and means mounting it for precession about an axis at an angle to the axis of the swinging pendulum, connecting means established between said pendulum and said gyroscope, and indicating means connected with said pendulum, said means indicating the angular displacement of said pendulum relative to its mounting means.

2. In combination, a frame, a gyroscope rotatably supported in said frame, a case, means pivotally mounting said frame in the case, a pendulum, means connecting said pendulum and frame, whereby said pendulum and said frame move simultaneously in relation to said case and in predetermined relation to each other, and means indicating the angular displacement of said pendulum relatively to said case, said means being operatively connected to said pendulum.

3. An inclinometer comprising in combination, a casing, a frame pivotally supported in said casing, a gyroscope rotatably mounted in said frame, driving means for rotating said gyroscope, a pendulum pivotally supported in said casing, linkage means connecting said frame and said pendulum, and means indicating the angular displacement of said pendulum relatively to said casing, said means being operatively connected to said pendulum.

4. An inclinometer comprising in combination, a casing, a pendulum mounted therein to swing about an axis, a gyroscope, means pivotally mounting the same in the casing so that it may have two degrees of freedom, means connecting the pendulum with the gyroscope, and an indicator connected with the pendulum and with the gyroscope and adapted to indicate the angular displacement of said pendulum relatively to said casing.

5. An inclinometer comprising in combination, a casing, a pendulum supported in said casing to swing about an axis, a gyroscope supported in said casing to precess about an axis, said axes being substantially perpendicular to each other, a connection established between the gyroscope and pendulum, and means indicating the angular displacement of said pendulum relatively to said casing, said means being operatively connected to said pendulum.

6. An inclinometer comprising in combination, a casing, a pendulum pivotally mounted therein, a frame pivotally mounted in the casing, a gyroscope journaled in said frame, a connecting linkage established between the pendulum and frame, said frame being adapted to be turned by the force of the gyroscope when the casing is moved about an axis parallel to the axis of said pendulum, and means indicating the angular displacement of said pendulum relatively to said casing, said means being operatively connected to said pendulum.

7. An indicating instrument of the class described comprising in combination, a pendulously mounted device, a gyroscopic device, means supporting said gyroscopic device for precession about an axis at an angle to an axis of oscillation of said pendulously mounted device, connecting means interposed between said devices whereby movement of one is controlled by movement of the other, and means indicating the angular displacement of said pendulously mounted device, said means being operatively connected to said pendulously mounted device.

8. An instrument of the class described comprising in combination, a pendulously mounted device, a gyroscopic device, means supporting said gyroscopic device for precession about an axis at an angle to an axis of oscillation of said pendulum, connecting means interposed between said devices whereby movement of one is controlled by movement of the other, damping means connected with the devices, and means indicating the angular displacement of said pendulously mounted device, said means being operatively connected to said pendulum.

9. An inclinometer comprising, a casing including an indicating scale, a gyroscope, means pivotally mounting the same in the casing so that it may have two degrees of freedom, a pendulum pivoted in the casing beyond the gyroscope away from the scale, an indicating hand movable along said scale, means reaching from the pendulum by the gyroscope to the hand by which the hand is operated, and a connection between the pendulum and the gyroscope.

10. An indicator of the longitudinal attitude of a dirigible vehicle, comprising in combination, a gyroscope arranged with its axis of precession in a vertical plane extending longitudinally of said vehicle, a pendulum arranged with its axis substantially perpendicular to said plane, a pivotal link connection between said gyroscope and said pendulum, a casing enclosing said gyroscope and pendulum, and means to indicate the relative movement between said pendulum and said case.

11. In an inclinometer, a housing, a dial and indicating means provided therewith, a gyroscope mounted for precession in the housing, a shaft journaled in the housing transversely to the axis of gyroscopic precession, a pivotal link connection between the shaft and gyroscope so that precessional movement of the latter oscillates the shaft, an arm connected between the shaft and indicating means whereby the latter is actuated by oscillation of the shaft, and a pendulum interconnected with the pivotal link and arm and cooperating with the gyroscope to produce reliable indications on the dial.

12. In an inclinometer, a housing, a dial and indicating means provided therewith, a gyroscope mounted for precession in the housing, a shaft journaled in the housing transversely to the axis of gyroscopic precession, a pivotal link connection between the shaft and gyroscope so that precessional movement of the latter oscillates the shaft, an arm connection between the shaft and indicating means whereby the latter is actuated by oscillation of the shaft, a pendulum interconnected with the pivotal link and arm and cooperating with the gyroscope to produce reliable indications on the dial, a dash pot including a piston and cylinder disposed substantially vertically and mounted in the housing between the transverse shaft and the gyroscope, a lever carried by the shaft and including a portion projecting horizontally over the dash pot on one side of the shaft and a portion projecting horizontally on the other side of the shaft, a link connecting the dash pot piston with the horizontal lever thereabove, and a counterbalance weight carried on the other end of the lever.

13. In an inclinometer, a housing having indicating means at one end thereof, a shaft journaled at the other end thereof transversely to the longitudinal axis of the housing, an arm having one end thereof fixed to the shaft and extending forwardly and having its other end connected with the indicating means, a pendulum bob depending from the shaft and having a rod portion projecting above said shaft, a link having one end pivotally connected with the pendulum rod above the shaft and extending forwardly in the casing and being disposed in spaced relation from the arm, a gyro frame mounted on a vertical axis which is disposed between the arm and link and the link being pivotally connected to the frame, and a gyroscopic rotor journaled on a horizontal axis in the frame.

14. An indicator of the longitudinal attitude of an aircraft comprising a gyroscope arranged with its axis of precession in a vertical plane which extends longitudinally of the aircraft, a pendulous system whose axis of oscillation is substantially perpendicular to said vertical plane, means operatively connecting the gyroscope with said pendulous system to transmit the precessional force of the gyroscope to said pendulous system to counteract the error which otherwise would be introduced by acceleration of the pendulum, and indicating means operated by the gyroscope and pendulous system.

15. An indicator of the longitudinal attitude of an aircraft comprising in combination, a pendulous system which tends to deflect in relation to the aircraft upon a change in position of the aircraft about its lateral axis, gyroscopic means, an operating connection between the pendulous system and gyroscopic means for exerting force by gyroscopic precession on said pendulous system when said change of the position of the aircraft about the lateral axis thereof occurs, a casing within which said pendulous system and said gyroscopic means are operatively mounted and by which the indicator is installed in the aircraft, and indicating means observable outside of said casing and actuated by the deflecting movements of said pendulous system as influenced by the precessional force of said gyroscopic means when the aircraft changes its position about its lateral axis.

16. An indicator of the longitudinal atticture of an aircraft comprising a pendulous means which tends to deflect with respect to the aircraft upon change of position of said aircraft about a lateral axis, gyroscopic means the precessional force of which is set in operation by said change of position of the aircraft about said lateral axis to impress its precessional force against the pendulous means to increase its deflection with respect to the aircraft, and an indicator operatively connected with the means.

Signed at Brooklyn in the county of Kings and State of New York this 6 day of December A. D. 1923.

MORRIS M. TITTERINGTON.